United States Patent
Evans

(10) Patent No.: US 10,612,217 B2
(45) Date of Patent: Apr. 7, 2020

(54) WATER LEAK DETECTION ASSEMBLY

(71) Applicant: Rick Evans, Pinellas Park, FL (US)

(72) Inventor: Rick Evans, Pinellas Park, FL (US)

( * ) Notice: Subject to any disclaimer, the term of this patent is extended or adjusted under 35 U.S.C. 154(b) by 16 days.

(21) Appl. No.: 16/005,439

(22) Filed: Jun. 11, 2018

(65) Prior Publication Data
US 2019/0377369 A1 Dec. 12, 2019

(51) Int. Cl.
- *E03B 7/07* (2006.01)
- *G01M 3/18* (2006.01)
- *F17D 5/06* (2006.01)
- *G08B 21/20* (2006.01)
- *G05D 7/06* (2006.01)

(52) U.S. Cl.
CPC .............. *E03B 7/071* (2013.01); *F17D 5/06* (2013.01); *G01M 3/18* (2013.01); *G05D 7/0623* (2013.01); *G08B 21/20* (2013.01); *Y02A 20/15* (2018.01); *Y10T 137/1842* (2015.04)

(58) Field of Classification Search
CPC .............. E03B 7/071; Y10T 137/1842; Y10T 137/5762; Y10T 137/0452; Y02A 20/15; G01M 3/16; G01M 3/165; G01M 3/18; G08B 21/20; F17D 5/06
See application file for complete search history.

(56) References Cited

U.S. PATENT DOCUMENTS

| | | | | |
|---|---|---|---|---|
| 3,874,403 A | * | 4/1975 | Fischer | D06F 39/081 137/386 |
| 4,845,472 A | * | 7/1989 | Gordon | D06F 39/081 340/605 |
| 5,190,069 A | * | 3/1993 | Richards | G01M 3/18 137/312 |
| 5,240,022 A | * | 8/1993 | Franklin | F16K 5/0647 137/1 |
| 5,918,617 A | * | 7/1999 | Garth | D06F 39/081 137/1 |
| 5,992,218 A | * | 11/1999 | Tryba | G01M 3/16 73/40.5 R |
| 6,025,788 A | * | 2/2000 | Diduck | G01M 3/18 340/3.4 |
| 6,057,770 A | * | 5/2000 | Justesen | G01M 3/18 340/514 |
| 6,186,162 B1 | * | 2/2001 | Purvis | D06F 39/081 122/504.2 |
| 6,675,826 B1 | * | 1/2004 | Newman | F16K 31/082 122/504.2 |

(Continued)

*Primary Examiner* — Reinaldo Sanchez-Medina
*Assistant Examiner* — David Colon-Morales

(57) ABSTRACT

A water leak detection assembly for sensing and stopping a water leak in a building includes a screw that is inserted into a wall having the screw being positioned proximate a pipe for a plumbing fixture in a building. A sensing unit is provided and the sensing unit is positionable in the screw having the sensing unit being aligned with the pipe. The sensing unit senses moisture thereby facilitating the sensing unit to detect water leaking from the pipe. A shut off unit is provided and the shut off unit is fluidly coupled to a water supply pipe for the building and the shut off unit is in electrical communication with the sensing unit. The shut off unit turns off the water supply pipe when the sensing unit senses water thereby stopping the potential water leak.

17 Claims, 5 Drawing Sheets

(56) References Cited

U.S. PATENT DOCUMENTS

| | | | | |
|---|---|---|---|---|
| 6,810,902 B2* | 11/2004 | Bootka | ............... | E03C 1/242 |
| | | | | 137/312 |
| 7,082,959 B1* | 8/2006 | Franklin | ............ | F16K 17/383 |
| | | | | 137/312 |
| 7,084,776 B2* | 8/2006 | Tacilauskas | ............ | G01M 3/16 |
| | | | | 340/604 |
| 7,549,435 B2* | 6/2009 | Walter | ............ | F17D 5/06 |
| | | | | 137/15.11 |
| 7,671,754 B2 | 3/2010 | Heilmann | | |
| 7,926,504 B2* | 4/2011 | Sharp | ............ | E03B 7/071 |
| | | | | 137/15.11 |
| 8,130,107 B2* | 3/2012 | Meyer | ............ | G01M 3/18 |
| | | | | 137/312 |
| 8,201,572 B2* | 6/2012 | Segal | ............ | E03B 7/071 |
| | | | | 137/15.11 |
| 8,643,497 B2 | 2/2014 | Murphy | | |
| D709,395 S | 7/2014 | Scharf | | |
| 8,776,824 B2* | 7/2014 | Yao | ............ | E03B 7/071 |
| | | | | 137/312 |
| 9,430,930 B2 | 8/2016 | Finn | | |
| 9,432,763 B2 | 8/2016 | Scharf | | |
| 9,670,650 B2* | 6/2017 | Pinney | ............ | E03B 7/072 |
| 9,976,288 B2* | 5/2018 | McAward | ............ | E03B 7/071 |
| 2002/0033759 A1 | 3/2002 | Morello | | |
| 2006/0191323 A1* | 8/2006 | Garabedian | ............ | F17D 5/06 |
| | | | | 73/40 |
| 2007/0289635 A1 | 12/2007 | Ghazarian | | |
| 2008/0133063 A1* | 6/2008 | Bisson | ............ | G01M 3/18 |
| | | | | 700/282 |
| 2008/0230623 A1* | 9/2008 | Macnow | ............ | F16K 31/46 |
| | | | | 239/11 |
| 2008/0246621 A1* | 10/2008 | Wu | ............ | G01M 3/16 |
| | | | | 340/605 |

\* cited by examiner

WATER LEAK DETECTION ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to detection devices and more particularly pertains to a new detection device for sensing and stopping a water leak in a building.

BRIEF SUMMARY OF THE INVENTION

An embodiment of the disclosure meets the needs presented above by generally comprising a screw that is inserted into a wall having the screw being positioned proximate a pipe for a plumbing fixture in a building. A sensing unit is provided and the sensing unit is positionable in the screw having the sensing unit being aligned with the pipe. The sensing unit senses moisture thereby facilitating the sensing unit to detect water leaking from the pipe. A shut off unit is provided and the shut off unit is fluidly coupled to a water supply pipe for the building and the shut off unit is in electrical communication with the sensing unit. The shut off unit turns off the water supply pipe when the sensing unit senses water thereby stopping the potential water leak.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
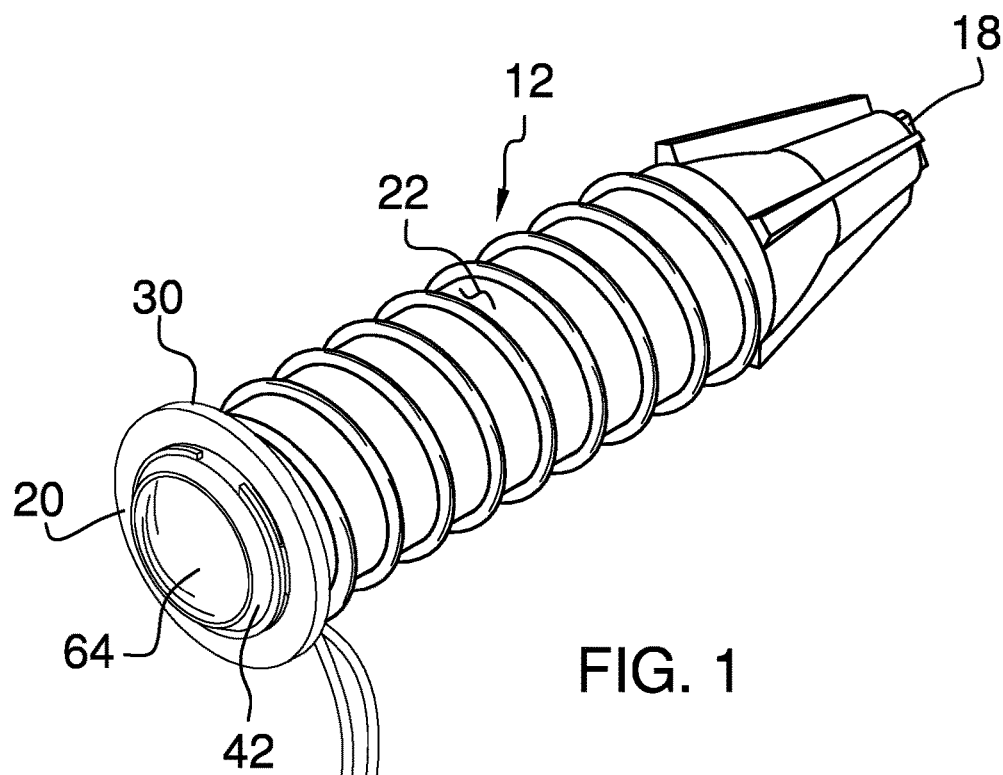
FIG. 1 is a perspective view of a water leak detection assembly according to an embodiment of the disclosure.
Figure 2:
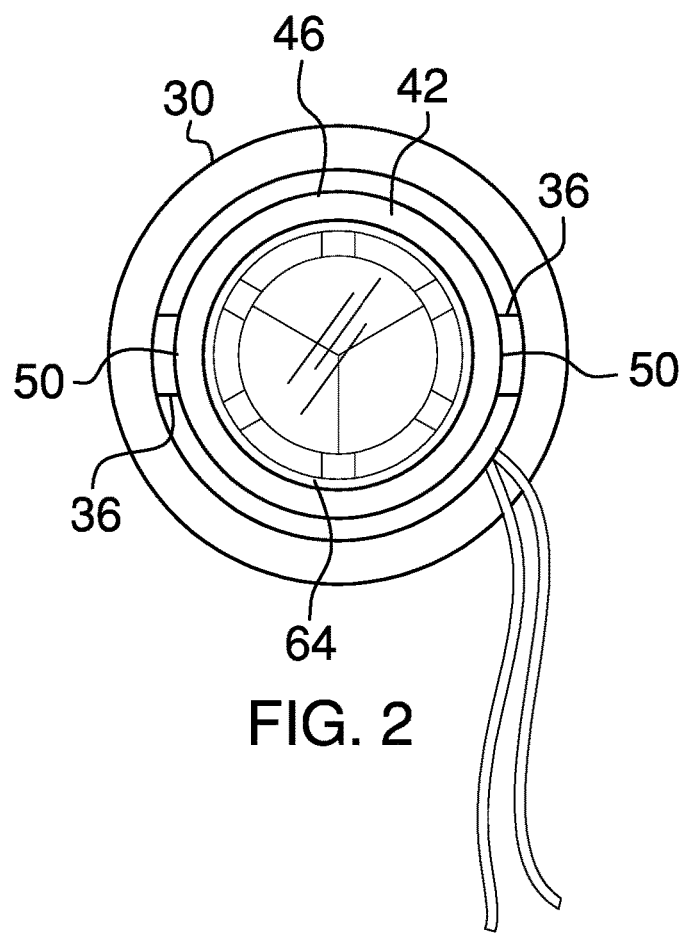
FIG. 2 is a front view of an embodiment of the disclosure.
Figure 3:
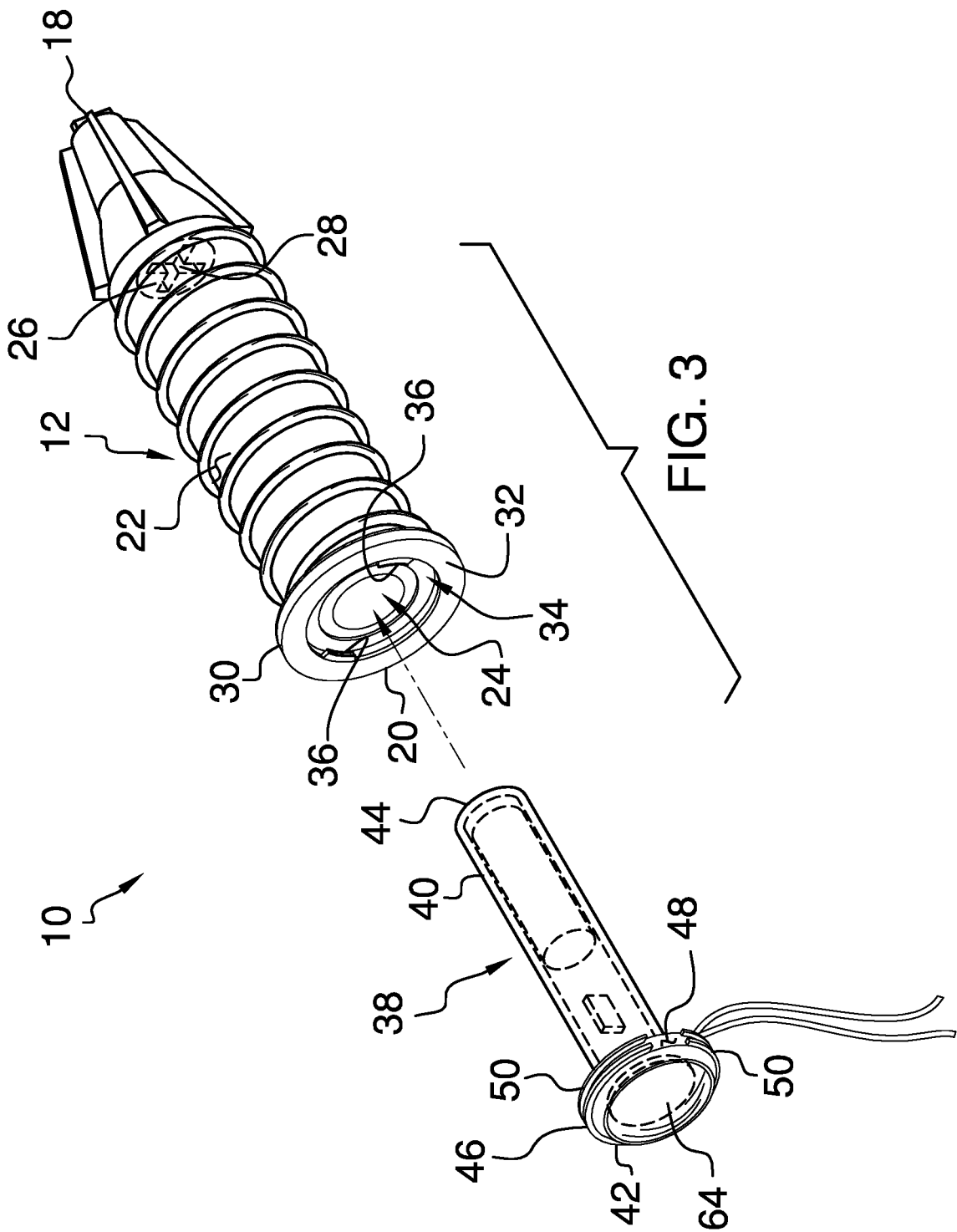
FIG. 3 is an exploded perspective view of an embodiment of the disclosure.
Figure 4:
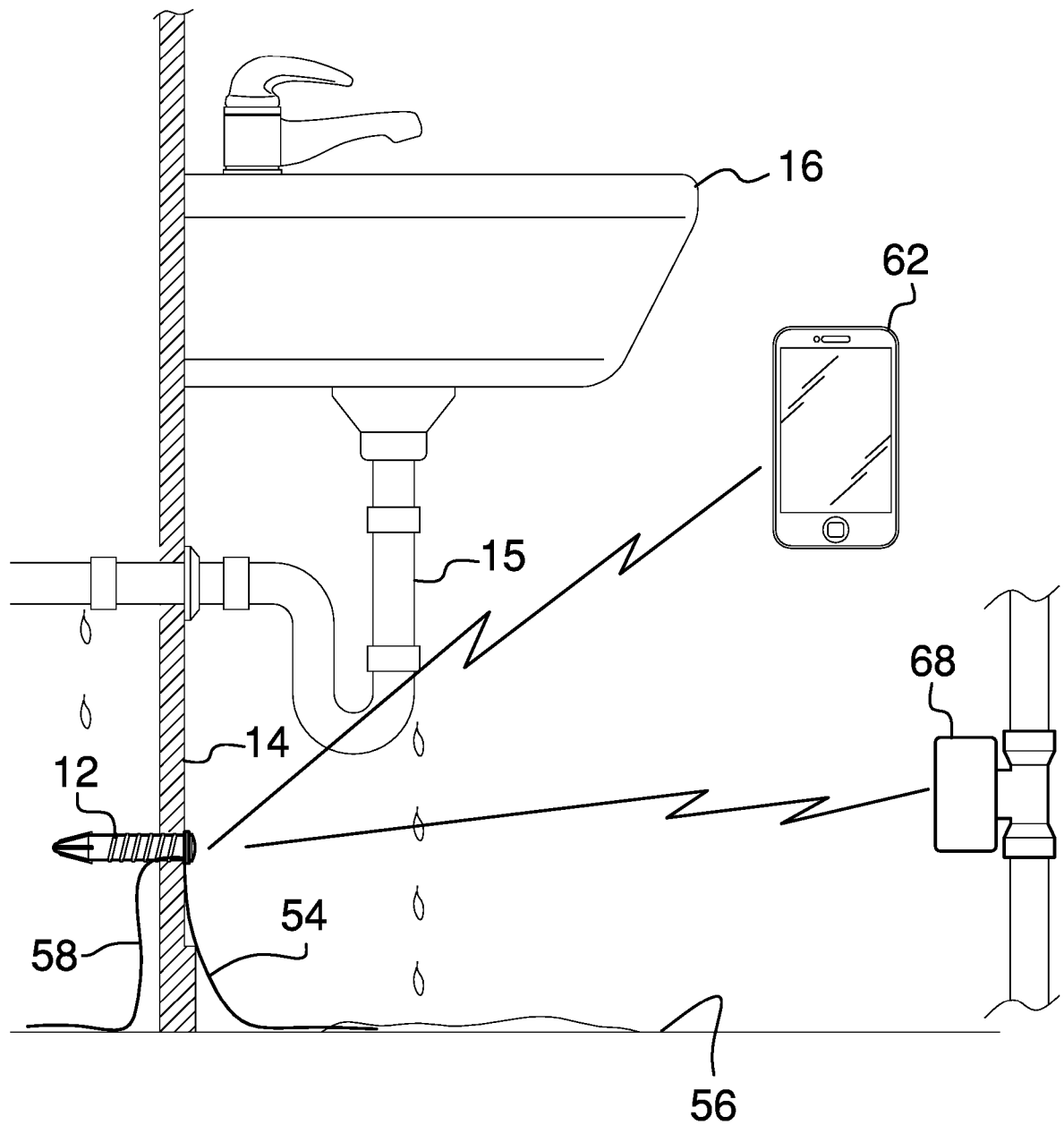
FIG. 4 is a perspective in-use view of an embodiment of the disclosure.
Figure 5:
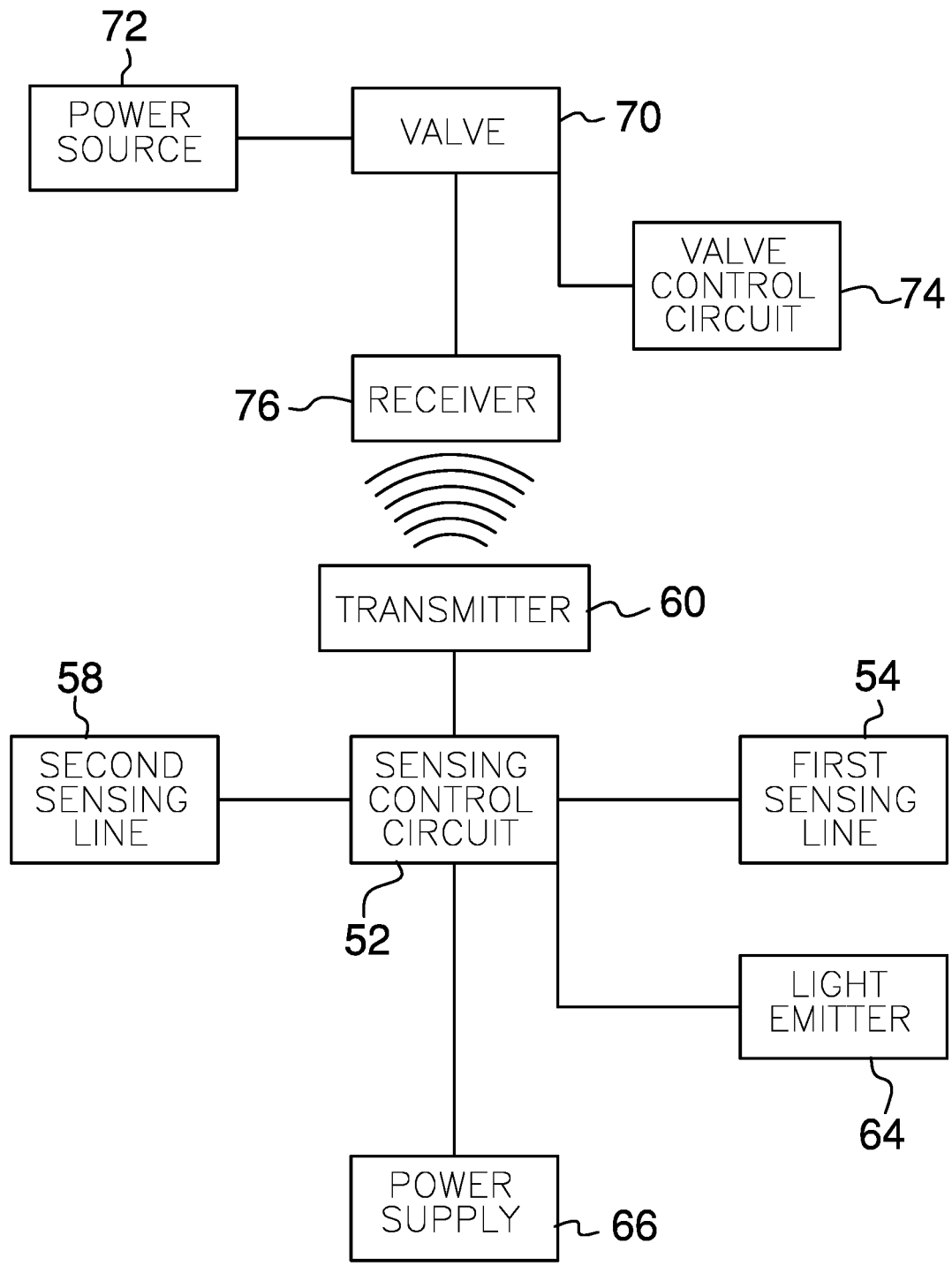
FIG. 5 is a schematic view of an embodiment of the disclosure.
Figure 6:
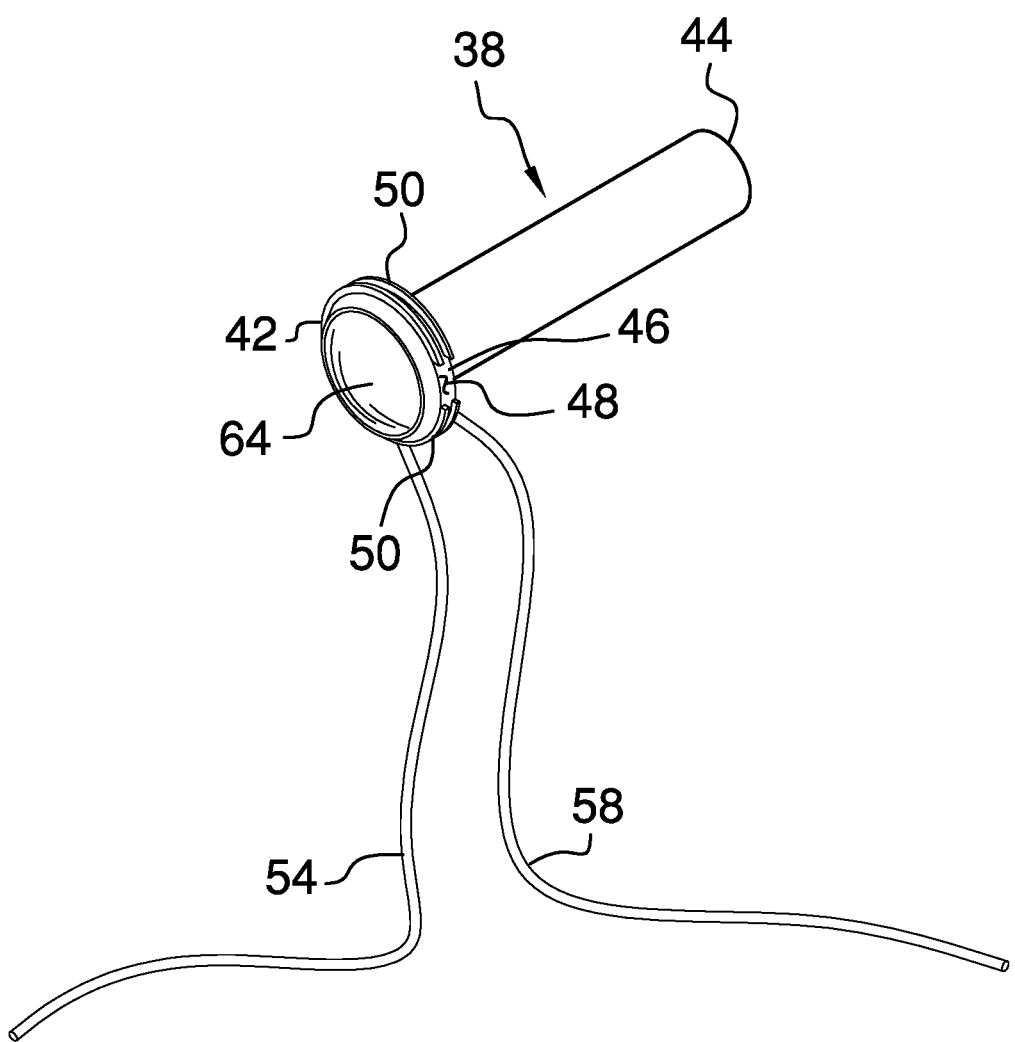
FIG. 6 is a perspective view of a sensing unit of an embodiment of the disclosure.

With reference now to the drawings, and in particular to FIGS. 1 through 6 thereof, a new detection device embodying the principles and concepts of an embodiment of the disclosure and generally designated by the reference numeral 10 will be described.

As best illustrated in FIGS. 1 through 6, the water leak detection assembly 10 generally comprises a screw 12 that is inserted into a wall 14 having the screw 12 being positioned proximate a pipe 15 for a plumbing fixture 16 in a building. The plumbing fixture 16 may be a sink, tub, shower, toilet and any other plumbing fixture 16 commonly found in a building. The pipe 15 may be a drain pipe, a sewer line, a water line and any other type of plumbing line commonly associated with plumbing fixtures. The screw 12 has a first end 18, a second end 20 and an outer surface 22 extending therebetween, and the first end 18 tapers to a point for piercing the wall 14.

The outer surface 22 is threaded to threadably engage the wall 14 and the second end 20 has a well 24 extending toward the first end 18. The well 24 has a lower bounding surface 26 and the lower bounding surface 26 has a phillips screw recess 28 extending therein. Thus, the phillips screw recess 28 can be engaged by a phillips screw driver thereby facilitating the screw 12 to be screwed into the wall 14. The outer surface 22 has a first lip 30 extending outwardly therefrom and the first lip 30 has a first surface 32 that is aligned with the second end 20 of the screw 12. The first surface 32 has a recess 34 therein extending around an entire circumference of the second end 20. Additionally, the first lip 30 has a pair of tabs 36 coupled thereto and each of the tabs 36 extends inwardly toward a center line of the second end 20.

A sensing unit 38 is included and the sensing unit 38 is positionable in the screw 12 having the sensing unit 38 being aligned with the pipe 15. The sensing unit 38 senses moisture thereby facilitating the sensing unit 38 to detect water leaking from the pipe 15 or the plumbing fixture 16. The sensing unit 38 comprises a tube 40 that has a first end 42 and a second end 44. The tube 40 is insertable into the well 24 in the screw 12 having the first end 42 of the tube 40 being aligned with the second end 44 of the tube 40.

The tube 40 has a second lip 46 extending outwardly therefrom and the second lip 46 is aligned with the first end 42 of the tube 40. The second lip 46 has an outwardly facing surface 48 and the outwardly facing surface 48 has a plurality of engagements 50 thereon. The tube 40 is rotatable in the screw 12 when the tube 40 is inserted into the screw 12 having each of the engagements 50 releasably engaging a respective one of the tabs 36 to retain the tube 40 with the screw 12. A sensing control circuit 52 is remotely positioned with respect to the tube 40 and the sensing control circuit 52 may be positioned within a housing.

A first sensing line 54 is coupled to and extends outwardly from the tube 40 and the first sensing line 54 is electrically coupled to the sensing control circuit 52. The first sensing line 54 extends outwardly from the screw 12 when the tube 40 is positioned in the screw 12. Moreover, the first sensing line 54 lies on a floor 56 beneath the plumbing fixture 16 when the screw 12 is screwed into the wall 14. The sensing control circuit 52 receives a first input when the first sensing line 54 makes contact with water.

A second sensing line 58 is coupled to and extends outwardly from the tube 40 and the second sensing line 58 is electrically coupled to the sensing control circuit 52. The second sensing line 58 extends outwardly from the screw 12 when the tube 40 is positioned in the screw 12. The second sensing line 58 lies on a floor 56 beneath the pipe 15 when the screw 12 is screwed into the wall 14. Moreover, the sensing control circuit 52 receives a second input when the second sensing line 58 makes contact with water. Each of the first 56 and second 58 sensing lines may be capacitive sensing conductors or the like that are capable of detecting the electrically conductive properties of water.

A transmitter 60 is remotely positioned with respect to the tube 40 and the transmitter 60 is electrically coupled to the sensing control circuit 52. Additionally, the transmitter 60 may be positioned in the housing with the sensing control circuit 52. The transmitter 60 transmits a shut off signal when the sensing control circuit 52 receives either of the first input or the second input. Additionally, the transmitter 60 is in electrical communication with an electronic device 62, such as a smart phone or the like, that is carried by a user. Thus, the transmitter 60 can notify the user of a potential water leak. The transmitter 60 may be a radio frequency transmitter or the like and the transmitter 60 may employ a WPAN signal thereby facilitating the transmitter 60 to communicate with the electronic device 62 via the internet or other electronic communication network.

A light emitter 64 is coupled to the second end 20 of the tube 40 and the light emitter 64 is electrically coupled to the sensing control circuit 52. The light emitter 64 is turned on when the sensing control circuit 52 receives either of the first input or the second input. Thus, the light emitter 64 emits a visual alert of the potential water leak, thereby facilitating the user to identify the location of the potential water leak. The light emitter 64 may be an LED or the like that is capable of emitting light in a plurality of colors. A power supply 66 is positioned within the tube 40, the power supply 66 is electrically coupled to the sensing control circuit 52 and the power supply 66 comprises at least one battery. A plurality of the screws 12 and sensing units 38 may be provided and each of the screws 12 and sensing units 38 may be positioned proximate a respective one of a plurality of plumbing fixtures 16 in the building.

A shut off unit 68 is fluidly coupled to a water supply pipe 15 for the building and the shut off unit 68 is in electrical communication with the sensing unit 38. The shut off unit 68 turns off the water supply pipe 15 when the sensing unit 38 senses water. In this way the shut off unit 68 may stop the potential water leak. The shut off unit 68 comprises a valve 70 that is fluidly coupled to the water supply pipe 15. The valve 70 is positionable in a closed position to inhibit water from flowing through the water supply pipe 15. Moreover, the valve 70 is electrically coupled to a power source 72 comprising an electrical system of the building. The valve 70 may be an electrically operated fluid valve 70 of any conventional design.

A valve control circuit 74 is coupled to the valve 70 and the valve control circuit 74 is electrically coupled to the valve 70. A receiver 76 is coupled to the valve 70 and the receiver 76 is electrically coupled to the valve control circuit 74. The receiver 76 is in electrical communication with the transmitter 60 such that the receiver 76 receives the shut off signal from the transmitter 60. The valve control circuit 74 receives a shut off input from the receiver 76 when the receiver 76 receives the shut off signal. Moreover, the valve 70 is actuated into the closed position when the valve control circuit 74 receives the shut off input.

In use, the screw 12 is screwed into the wall 14 such that the screw 12 extends fully through the wall 14 at a location beneath the plumbing fixture 16. The tube 40 is inserted into the well 24 in the screw 12 and the second sensing line 58 is extended between the screw 12 and the wall 14 such that the second sensing line 58 extends down to the floor 56 behind the wall 14. In this way the second sensing line 58 can be positioned beneath plumbing that is behind the wall 14. The first sensing line 54 extends down to the floor 56 in front of the wall 14 beneath the plumbing fixture 16. The transmitter 60 transmits the shut off signal with either of the first 54 or second 58 sensing lines senses water. Thus, the valve 70 is actuated to shut off the water supply pipe 15 thereby stopping the water leak. Additionally, the transmitter 60 transmits the shut off signal to the electronic device 62 to notify the user of the water leak.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A water leak detection assembly being configured to detect a water leak in a plumbing fixture and subsequently turn off a water supply, said assembly comprising:

a screw being inserted into a wall having said screw being positioned proximate a pipe for the plumbing fixture in a building;

a sensing unit being positionable in said screw having said sensing unit being aligned with the pipe, said sensing unit sensing moisture wherein said sensing unit is configured to detect water leaking from the pipe; and a shut off unit being fluidly coupled to a water supply pipe for the building, said shut off unit being in electrical communication with said sensing unit, said shut off unit turning off the water supply pipe when said sensing unit senses water wherein said shut off unit is configured to stop the potential water leak.

2. The assembly according to claim 1, wherein said screw has a first end, a second end and an outer surface extending therebetween, said first end tapering to a point wherein said first end is configured to pierce the wall, said outer surface being threaded wherein said outer wall is configured to threadably engage the wall, said second end having a well extending toward said first end, said well having a lower bounding surface.

3. The assembly according to claim 2, wherein said lower bounding surface has a phillips screw recess extending therein wherein said phillips screw recess is configured to be engaged by a phillips screwdriver thereby facilitating said screw to be screwed into the wall.

4. The assembly according to claim 3, wherein said outer surface has a first lip extending outwardly therefrom, said first lip having a first surface being aligned with said second end of said screw.

5. The assembly according to claim 4, wherein said first surface has a recess therein extending around an entire circumference of said second end, said first lip having a pair of tabs being coupled thereto and extending inwardly toward said second end.

6. The assembly according to claim 5, wherein said sensing unit comprises a tube having a first end and a second end, said tube being insertable into said well in said screw having said first end of said tube being aligned with said second end of said tube.

7. The assembly according to claim 6, wherein said tube has a second lip extending outwardly therefrom, said second lip being aligned with said first end of said tube, said second lip having an outwardly facing surface, said outwardly facing surface having a plurality of engagements thereon, said tube being rotatable in said screw when said tube is inserted into said screw having each of said engagements releasably engaging a respective one of said tabs to retain said tube with said screw.

8. The assembly according to claim 1, wherein said sensing unit includes:
a tube being insertable into said screw; and
a sensing control circuit being remotely positioned with respect to said tube.

9. The assembly according to claim 8, further comprising a first sensing line being coupled to and extending outwardly from said tube, said first sensing line being electrically coupled to said sensing control circuit, said first sensing line extending outwardly from said screw when said tube is positioned in said screw having said first sensing line lying on a floor beneath the plumbing fixture, said sensing control circuit receiving a first input when said first sensing line makes contact with water.

10. The assembly according to claim 9, further comprising a second sensing line being coupled to and extending outwardly from said tube, said second sensing line being electrically coupled to said sensing control circuit, said second sensing line extending outwardly from said screw when said tube is positioned in said screw having said second sensing line lying on the floor beneath the pipe, said sensing control circuit receiving a second input when said second sensing line makes contact with water.

11. The assembly according to claim 10, further comprising a transmitter being remotely positioned with respect to said tube, said transmitter being electrically coupled to said sensing control circuit, said transmitter transmitting a shut off signal when said sensing control circuit receives either of said first input or said second input, said transmitter being in electrical communication with an electronic device being carried by a user wherein said transmitter is configured to notify the user of a potential water leak.

12. The assembly according to claim 10, further comprising a light emitter being coupled to said second end of said tube, said light emitter being electrically coupled to said sensing control circuit, said light emitter being turned on when said sensing control circuit receives either of said first input or said second input thereby facilitating said light emitter to emit a visual alert of the potential water leak.

13. The assembly according to claim 10, further comprising a power supply being positioned within said tube, said power supply being electrically coupled to said sensing control circuit, said power supply comprising at least one battery.

14. The assembly according to claim 1, wherein said shut off unit comprises a valve being fluidly coupled to the water supply pipe, said valve being positionable in a closed position to inhibit water from flowing through the water supply pipe, said valve being electrically coupled to a power source comprising an electrical system of the building.

15. The assembly according to claim 14, further comprising a valve control circuit being coupled to said valve, said valve control circuit being electrically coupled to said valve.

16. The assembly according to claim 15, further comprising:
a transmitter being coupled to said sensing unit, said transmitter transmitting a shut off signal; and
a receiver being coupled to said valve, said receiver being electrically coupled to said valve control circuit, said receiver being in electrical communication with said transmitter such that said receiver receives said shut off signal from said transmitter, said valve control circuit receiving a shut off input from said receiver when said receiver receives said shut off signal, said valve being actuated into said closed position when said valve control circuit receives said shut off input.

17. A water leak detection assembly being configured to detect a water leak in a plumbing fixture and subsequently turn off a water supply, said assembly comprising:
a screw being inserted into a wall having said screw being positioned proximate a pipe for the plumbing fixture in a building, said screw having a first end, a second end and an outer surface extending therebetween, said first end tapering to a point wherein said first end is configured to pierce the wall, said outer surface being threaded wherein said outer wall is configured to threadably engage the wall, said second end having a well extending toward said first end, said well having a lower bounding surface, said lower bounding surface having a phillips screw recess extending therein wherein said phillips screw recess is configured to be engaged by a phillips screwdriver thereby facilitating said screw to be screwed into the wall, said outer surface having a first lip extending outwardly therefrom, said first lip having a first surface being aligned with said second end of said screw, said first surface having a recess therein extending around an entire circumference of said second end, said first lip having a pair of tabs being coupled thereto and extending inwardly toward said second end;
a sensing unit being positionable in said screw having said sensing unit being aligned with the pipe, said sensing unit sensing moisture wherein said sensing unit is configured to detect water leaking from the pipe, said sensing unit comprising:

a tube having a first end and a second end, said tube being insertable into said well in said screw having said first end of said tube being aligned with said second end of said tube, said tube having a second lip extending outwardly therefrom, said second lip being aligned with said first end of said tube, said second lip having an outwardly facing surface, said outwardly facing surface having a plurality of engagements thereon, said tube being rotatable in said screw when said tube is inserted into said screw having each of said engagements releasably engaging a respective one of said tabs to retain said tube with said screw;

a sensing control circuit being remotely positioned with respect to said tube;

a first sensing line being coupled to and extending outwardly from said tube, said first sensing line being electrically coupled to said sensing control circuit, said first sensing line extending outwardly from said screw when said tube is positioned in said screw having said first sensing line lying on a floor beneath the plumbing fixture, said sensing control circuit receiving a first input when said first sensing line makes contact with water;

a second sensing line being coupled to and extending outwardly from said tube, said second sensing line being electrically coupled to said sensing control circuit, said second sensing line extending outwardly from said screw when said tube is positioned in said screw having said second sensing line lying on the floor beneath the pipe, said sensing control circuit receiving a second input when said second sensing line makes contact with water;

a transmitter being remotely positioned with respect to said tube, said transmitter being electrically coupled to said sensing control circuit, said transmitter transmitting a shut off signal when said sensing control circuit receives either of said first input or said second input, said transmitter being in electrical communication with an electronic device being carried by a user wherein said transmitter is configured to notify the user of a potential water leak;

a light emitter being coupled to said second end of said tube, said light emitter being electrically coupled to said sensing control circuit, said light emitter being turned on when said sensing control circuit receives either of said first input or said second input thereby facilitating said light emitter to emit a visual alert of the potential water leak; and a power supply being positioned within said tube, said power supply being electrically coupled to said sensing control circuit, said power supply comprising at least one battery; and a shut off unit being fluidly coupled to a water supply pipe for the building, said shut off unit being in electrical communication with said sensing unit, said shut off unit turning off the water supply pipe when said sensing unit senses water wherein said shut off unit is configured to stop the potential water leak, said shut off unit comprising:

a valve being fluidly coupled to the water supply pipe, said valve being positionable in a closed position to inhibit water from flowing through the water supply pipe, said valve being electrically coupled to a power source comprising an electrical system of the building;

a valve control circuit being coupled to said valve, said valve control circuit being electrically coupled to said valve; and a receiver being coupled to said valve, said receiver being electrically coupled to said valve control circuit, said receiver being in electrical communication with said transmitter such that said receiver receives said shut off signal from said transmitter, said valve control circuit receiving a shut off input from said receiver when said receiver receives said shut off signal, said valve being actuated into said closed position when said valve control circuit receives said shut off input.

* * * * *